(No Model.)

T. B. HOWE.
RAKING ATTACHMENT FOR FURNACES.

No. 246,012. Patented Aug. 23, 1881.

WITNESSES.
N. E. Fowler.
F. H. Knight.

INVENTOR
Thomas B. Howe
by Hill & Church
his ATTORNEY.

UNITED STATES PATENT OFFICE.

THOMAS B. HOWE, OF SCRANTON, PENNSYLVANIA, ASSIGNOR OF ONE-HALF TO ARTHUR H. LEE, OF SAME PLACE.

RAKING ATTACHMENT FOR FURNACES.

SPECIFICATION forming part of Letters Patent No. 246,012, dated August 23, 1881.

Application filed June 24, 1881. (No model.)

*To all whom it may concern:*

Be it known that I, THOMAS BORTREE HOWE, of Scranton, in the county of Lackawanna and State of Pennsylvania, have invented certain new and useful Improvements in Raking Attachments for Furnaces; and I do hereby declare the following to be a full, clear, and exact description of the same, reference being had to the accompanying drawings, forming a part of this specification, in which—

Figure 1:
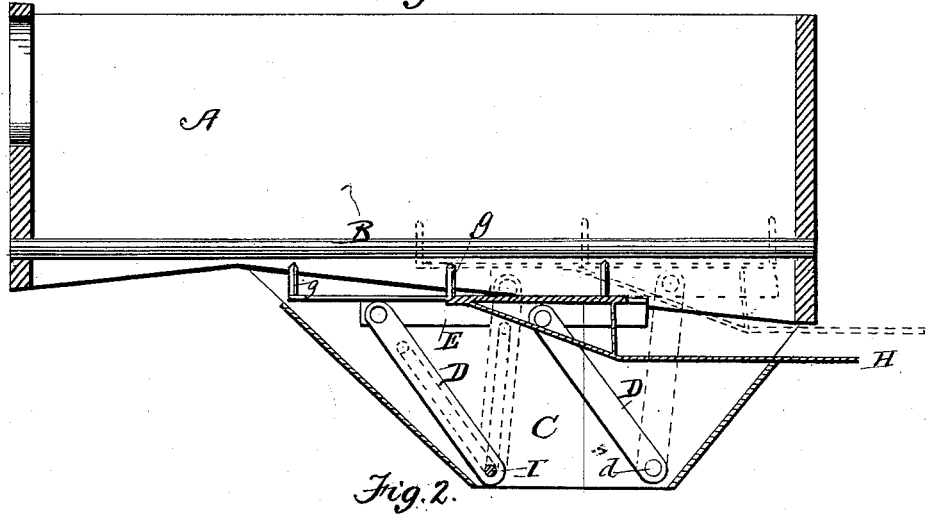
Figure 2:
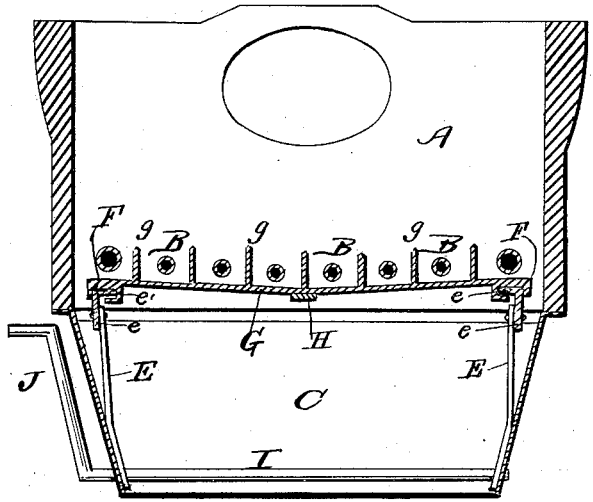

Figure 1 is a longitudinal sectional view; Fig. 2, a cross-sectional view, and Fig. 3 a view of a modification.

Similar letters of reference in the several figures denote the same parts.

This invention has for its object to provide a raking attachment for locomotives and other furnaces, so constructed and arranged as not to be exposed to the action of the fire except when in actual use for raking; and it consists in a combination of parts for effecting such object, which I will now proceed to describe.

In the drawings, A represents an ordinary locomotive-furnace, having its grate-bars B of any suitable construction, though preferably made tubular for the circulation of water, as is now customary.

At one end of the furnace, below the grate, is arranged an ash box or hopper, C, having inclined walls and adapted to collect the ashes and cinders which fall through the grate. Pivoted to the lower part of each of the sides of this ash-box is a pair of metal arms, D D, the same being connected at their upper ends by metal bars E E. Said bars E E are preferably of right-angular or ⌐ form, and the arms are articulated to their lower portions or flanges, $e$, by pivots, as shown, thus leaving the upper portions or horizontal flanges, $e'$, free, so as to form a guide, upon which fit and are adapted to slide hollow bars F F, to which are secured cross-bars G, carrying vertically-projecting raking-fingers $g$ $g$, as shown in Fig. 2.

A shaking rod or bar, H, is attached to the cross-bars, and projects out beyond the end of the furnace into convenient position to be operated, and by reciprocating this shaking-rod back and forth the raking-frame (consisting of hollow bars F and cross-bars G) is made to slide back and forth upon the guide-bars E E, as will be readily understood.

The lower ends of the arms D, which are nearest the feed end of the furnace, are secured to the ash-box by short pivots $d$; but the lower ends of the forward arms, D, are rigidly secured to a cross-shaft, I, which passes through the walls of the ash-box and terminates at one end in a crank, J. When the crank is turned down, as shown in full lines in Fig. 1, the arms D D are moved out of a vertical position, and the raking-frame is lowered so that the raking-fingers lie below the grate, and this is the normal position of the attachment.

When it is desired to rake the fire the crank is turned up so as to bring the arms D D into a vertical position and cause the raking-fingers to be projected up between the grate-bars into the fire, as shown in dotted lines, Fig. 1, and by reciprocating the raking-frame back and forth by means of the shaking-rod the fire can be raked until cleared of cinders and ashes. The crank is then again turned down, so as to withdraw the raking-fingers from the fire, as before.

A rod or other device is connected to the crank, so that it can be operated conveniently by the engineer or fireman from the cab.

With this arrangement the fire of a locomotive can be effectually raked without opening the door of the furnace and admitting cold air above the fire and cooling the furnace, as heretofore.

While I have shown the attachment as applied only to a locomotive-furnace, it is evident that it can be applied to furnaces in general with equal effect.

Figure 3:
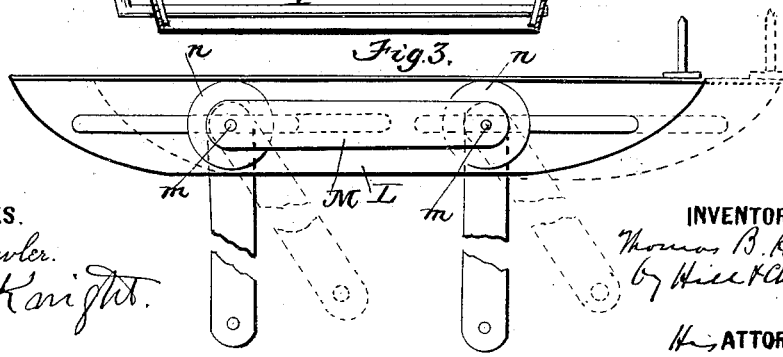

In Fig. 3 I have shown a modification of my invention, in which the reciprocating raking-frame is provided with a downwardly-projecting flange, L, which is slotted longitudinally, as shown. The pivots $m$ at the upper ends of the vibrating arms pass through said slot, and are connected on the inside by a bar, M. They also carry friction-rollers $n$. When the frame is reciprocated it travels back and forth on the rollers.

I am aware that a clearing attachment for stove-grates has before been employed, consisting of a longitudinally-reciprocating frame carrying a rocking bar, to which are secured raking-fingers, said rocking bar being adapted to be rocked so as to project the raking-fingers into or out of the fire at will, and such arrangement I do not therefore claim as my invention.

I claim as my invention—

1. In a raking attachment for furnaces, the combination of a reciprocating raking-frame moving longitudinally of the grate, and carrying fixed raking-fingers, with a guide and support for said frame, and means for raising and lowering the said guide, so as to project the raking-fingers into the fire between the grate-bars or retract them therefrom at will, substantially as described.

2. The reciprocating raking-frame moving longitudinally of the grate and carrying the fixed raking-fingers, in combination with the guide-bars, the pivoted arms to which the guide-bars are jointed, and the crank by means of which the raking-frame is raised and lowered at will, substantially as described.

THOMAS B. HOWE.

Witnesses:
  J. A. PRICE,
  DUNCAN WRIGHT.